United States Patent [19]
Henze

[11] Patent Number: 5,982,573
[45] Date of Patent: Nov. 9, 1999

[54] DISK DRIVE AND METHOD FOR MINIMIZING SHOCK-INDUCED DAMAGE

[75] Inventor: Richard H. Henze, San Carlos, Calif.

[73] Assignee: Hewlett-Packard Company, Palo Alto, Calif.

[21] Appl. No.: 08/168,805

[22] Filed: Dec. 15, 1993

[51] Int. Cl.⁶ .............................. G11B 21/02; G11B 15/04
[52] U.S. Cl. .................................................. 360/75; 360/60
[58] Field of Search ............................... 360/75, 60, 97.02

[56] References Cited

U.S. PATENT DOCUMENTS 5,227,929 7/1993 Comerford ................................ 360/75

FOREIGN PATENT DOCUMENTS 0 306 715 3/1989 European Pat. Off. .

OTHER PUBLICATIONS

"Active Compensation of Shock, Vibration, and Wind–up in Disk Drives" by: David B. Davis & Michael D. Sidman; Jul. 10, 1992 (revised Nov. 28, 1991).

Primary Examiner—W. Chris Kim

[57] ABSTRACT

A disk drive has a fall detection control system that detects when a disk drive is in a free fall, and takes precautionary protective action to minimize physical damage from any resulting shock upon impact. The disk drive includes an accelerometer device that measures acceleration of the disk drive along three mutually orthogonal axes x, y, and z and resolves the measurement into respective vectors $a_x$, $a_y$, and $a_z$. In one embodiment, a processor is programmed to (1) compute a net acceleration $a_{net}$ of the disk drive, (2) compare the net acceleration $a_{net}$ with the selected acceleration threshold level, (3) measure a duration that the net acceleration $a_{net}$ exceeds the acceleration threshold level, (4) compare the measured duration with a selected reference time period, and (5) output the warning signal when the measured duration exceeds the reference time period. Upon receipt of the warning signal, a controller initiates protective routines in preparation for shock.

1 Claim, 8 Drawing Sheets

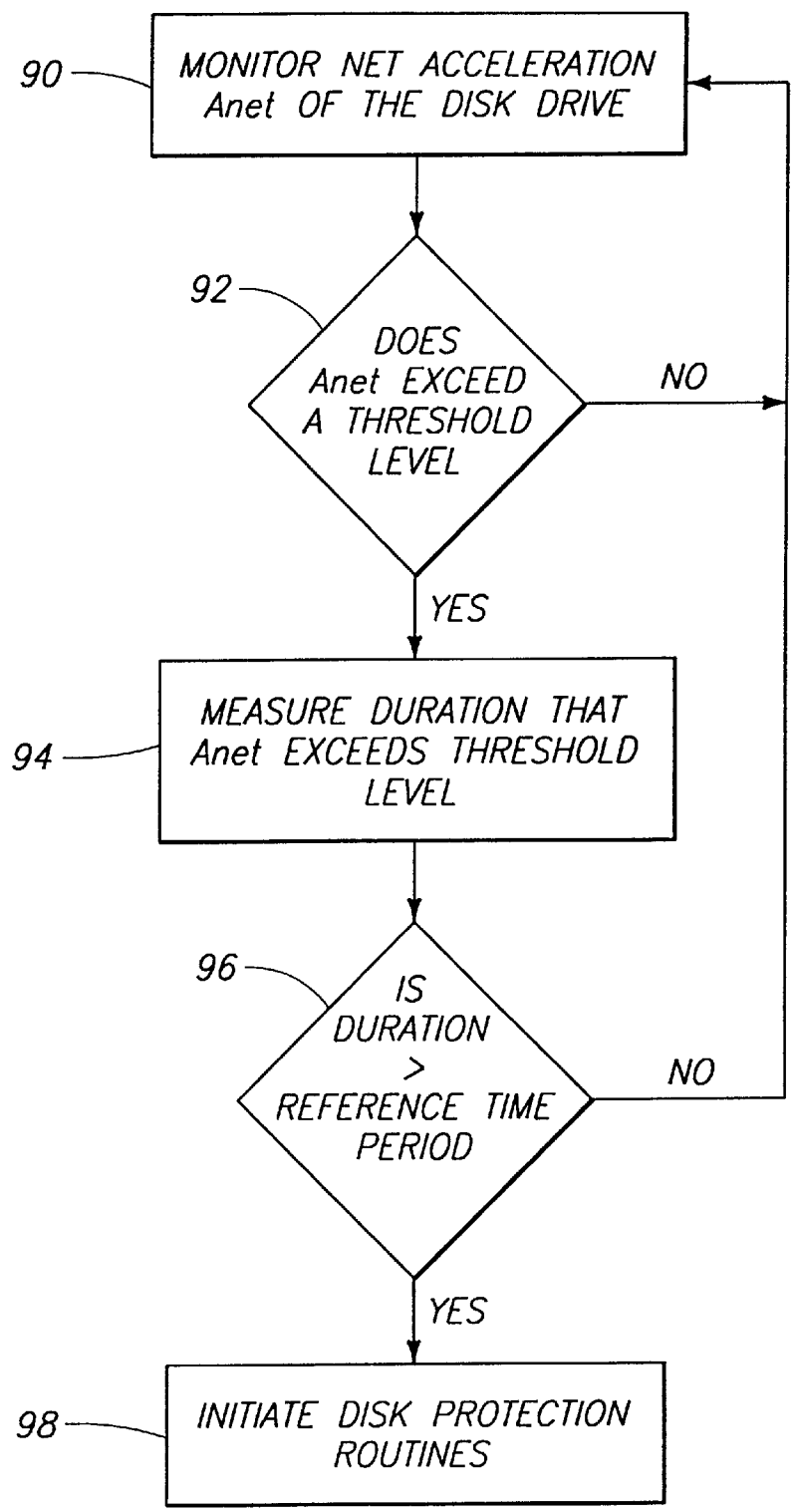

DISK DRIVE AND METHOD FOR MINIMIZING SHOCK-INDUCED DAMAGE

FIELD OF THE INVENTION

This invention relates to disk drives, and more particularly, to such drives and associated methods for minimizing shock-induced damage.

BACKGROUND OF THE INVENTION

Conventional disk drives employ a servo system which controls the radial position of an actuator arm relative to a rotating recording disk. The actuator arm supports a read/write head or transducer in cantilevered fashion above the disk. Ideally, the read/write head is maintained over the center of a selected track in the disk surface. The read/write head senses position information from the track, which is then used to develop a position error signal. The error signal is fed back through a compensator into a drive motor for the actuator arm to move the read/write head in a direction to reduce the error.

At one time, disk drives were employed primarily within immobile computers, where the disk drives sat motionless within the computer on a desktop or table. There was little likelihood that these drives would experience an immense shock from being dropped or severely jolted. Most external disturbances were in the form of vibrations which could, if sufficient in strength, cause the disk to move relative to the read/write head, resulting in an off track error.

Today, an increasing percentage of disk drives are being used in portable computers, such as laptops, notebooks, and palmtops, and other portable devices. A primary problem associated with contemporary designs of such disk drives concerns shock-induced damage created by the impact of a falling portable device colliding with a surface. For example, when a palmtop computer containing a small disk drive (such as a 1.3 inch disk drive) falls from a desk or user's hand onto a hard floor, the shock pulse magnitude generated at impact can be hundreds or thousands of g's.

The external shock yields two undesirable outcomes: physical damage and track misregistration. With respect to the first, the shock pulse may cause significant physical damage to the disk drive. A pulse of sufficient magnitude and orientation can overcome the air gap bearing which separates the slider from the rotating disk, thereby damaging the magnetic media film, the disk substrate, or the slider.

With respect to the second, the external disturbance imposes linear and radial accelerations that apply a moment to the actuator arm. This moment may exceed the tracking servo systems ability to maintain the read/write head within the allocated tracking error range required for acceptable data integrity. This problem is exacerbated by increased track density which reduces the acceptable tracking error range, and by the trend towards smaller form factor disk drives which are subjected to more rigorous operating environments. If a shock occurs during the data writing process, the disk drive is in jeopardy of miswriting the data off track, or worse, over previously written data on adjacent tracks.

To compensate for minor external disturbances, some prior art disk drives use an accelerometer with the servo system. The accelerometer senses acceleration caused by vibrations and the like. There are two primary techniques for using the accelerometer output to accommodate disturbances. The first is to actively and controllably compensate for the effects of the vibrations. The actuator is controlled to shift the read/write head in the direction of displacement effective to cancel the vibrations and eliminate the off track error.

The second technique is a write protect function designed to reduce the misregistration errors caused by external disturbances. The write protect function is triggered by large net accelerations output from the accelerometer. When acceleration exceeds a prescribed level (typically 2.5–10 g's for translational sensors), writing is interrupted before any data is written off track, thereby preventing data loss or misregistration. However, the write protect function is not very effective for alleviating the effects of an impact shock resulting from a free falling disk drive. The nominal acceleration of a falling disk drive is only 1 g, which is insufficient to initiate the write protect function. The read/write head remains over the data tracks. Upon impact, the acceleration easily exceeds the 2.5–10 g threshold, thereby enabling the write protect function, but the read/write head is still positioned over the disk which can cause significant physical damage to the disk drive.

The present invention concerns disk drives and associated methods for detecting shock-inducing events, such as free fall conditions, and taking protective action to minimize the damage and errors induced by such shock.

SUMMARY OF THE INVENTION

According to one aspect of this invention, a disk drive has a housing and at least one storage disk rotatably connected to the housing to spin about an axis of rotation. An actuator arm is operably connected to the housing to move relative to the storage disk and to radially position a read/write head across the storage disk. The disk drive further includes fall detection means mounted within the housing for sensing when the disk drive is falling from a first elevation to a second elevation by monitoring acceleration of the disk drive. The fall detection means outputs a warning signal when the acceleration of the disk drive exceeds a selected acceleration threshold level indicative of a falling disk drive for a selected reference time period. A control means then prepares, in response to the warning signal output by the fall detection means, the storage disk and/or the actuator arm for a shock induced when the disk drive impacts a surface at the second elevation.

According to another aspect of this invention, the fall detecting means has an accelerometer device and a processor. The accelerometer device measures acceleration of the disk drive along three mutually orthogonal axes x, y, and z and resolves the measurement into respective vectors $a_x$, $a_y$, and $a_z$. The processor is programmed to (1) compute a net acceleration $a_{net}$ of the disk drive from the vectors $a_x$, $a_y$, and $a_z$, (2) compare the net acceleration $a_{net}$ with the selected acceleration threshold level, (3) measure a duration that the net acceleration $a_{net}$ exceeds the acceleration threshold level, (4) compare the measured duration with the selected reference time period, and (5) output the warning signal when the measured duration exceeds the reference time period.

According to yet another aspect of this invention, a method for reducing shock damage in a disk drive when the disk drive falls from a first elevation and impacts a surface at a second elevation includes the following steps: (1) generating vectors $a_x$, $a_y$, and $a_z$ indicative of acceleration of the disk drive along three mutually orthogonal axes x, y, and z; (2) deriving a net acceleration $a_{net}$ of the disk drive as it falls; (3) comparing the net acceleration $a_{net}$ with a selected acceleration threshold level indicative of a falling disk drive; (4) measuring a time duration that the net acceleration $a_{net}$ exceeds the threshold level; (5) comparing the time duration with a selected reference time period; and (6) preparing the disk drive for impact with the surface when the measured duration exceeds the reference time period.

According to another aspect, the acceleration threshold level is within a range approximately from 0.4 g to 1.0 g and the reference time period is at least 90 msec.

BRIEF DESCRIPTION OF THE DRAWINGS

Preferred embodiments of the invention are described below with reference to the following accompanying drawings depicting examples embodying the best mode for practicing the invention.

FIG. 8 is a flow diagram illustrating an operating procedure according to this invention.

DETAILED DESCRIPTION OF THE INVENTION

As used in this disclosure, the letter "g" represents the downward acceleration of a body at the surface of the earth caused by gravitational forces on the body. The value of acceleration g is 9.8 m/sec2 or approximately 32 ft/sec$^2$ at sea level. This value varies about ½ to 1 percent depending upon the location and/or elevation on the earth's surface. The value of "g" may also be defined in another manner. It is the constant of proportionality between mass and weight, or said another way, the force of gravity per unit mass (i.e., F=mg=g, where m=1). Impact shocks, free fall, and other events discussed herein are valued relative to acceleration "g". For example, when it is said that the disk drive experiences 50 g's upon impact, this means that the disk drive experienced a force equal to fifty times the force of gravity per unit mass.

Figure 1:
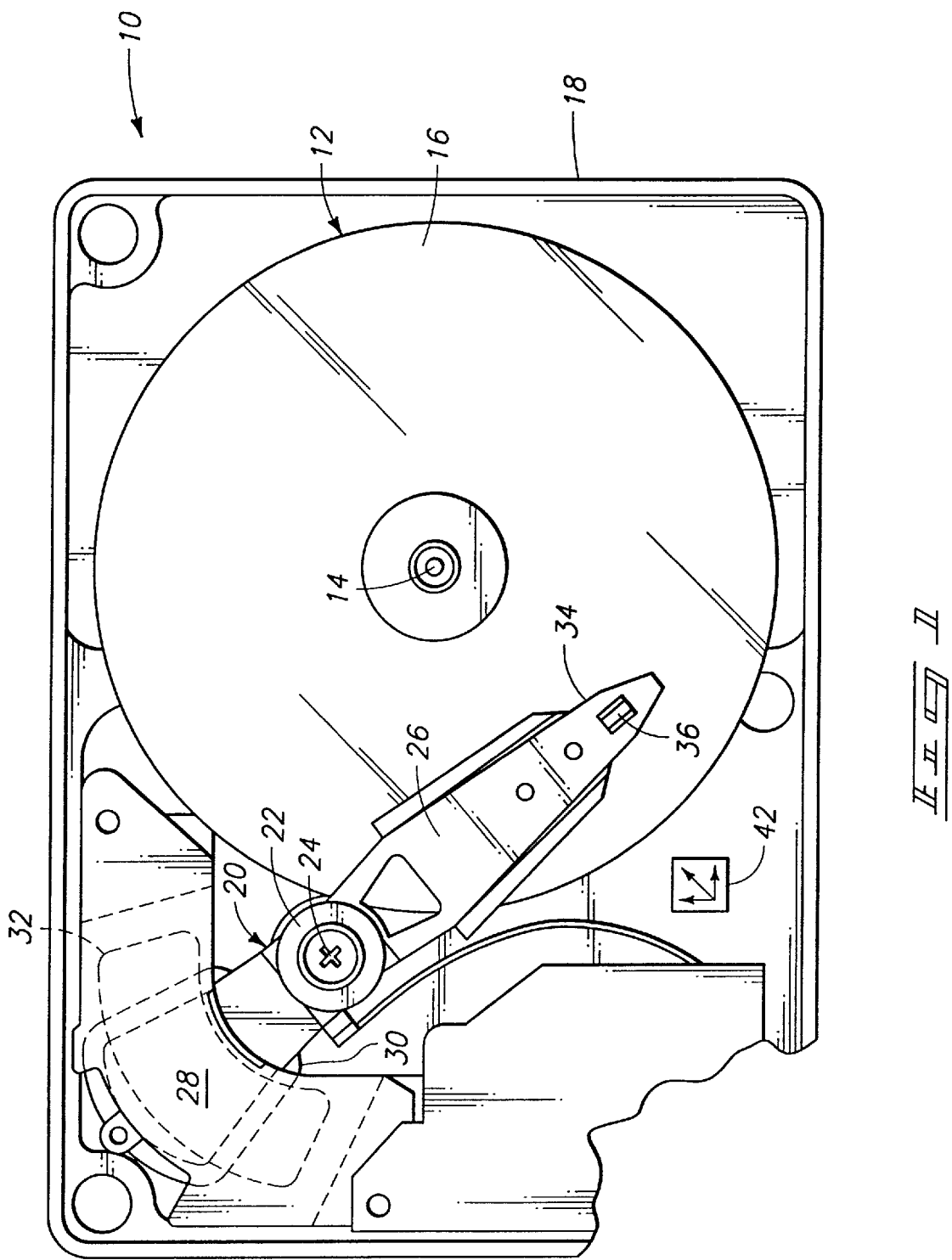
FIG. 1 is a plan view of a rotary actuator type of disk drive having an accelerometer device.

FIG. 1 shows a rotary actuator type disk drive 10, although this invention may be practiced in other types of disk drives, such as a linear actuator type disk drive. Disk drive 10 has a stacked array 12 of one or more magnetic disks aligned along a central axis of rotation 14, with the upper most disk 16 being shown in FIG. 1. The magnetic disks are rotatably connected to a housing 18 via a spindle assembly and powered by a motor or other drive mechanism (not shown) to spin about axis 14 at a substantially constant speed. The spindle assembly and housing supporting the disk array are of conventional design and thus are not described in detail.

A rotary actuator assembly 20 is positioned adjacent to the stacked disk array 12. The rotary actuator assembly 20 includes a bearing housing 22 and multiple load beam actuator arms which are controllably pivoted about an axis 24 relative to bearing housing 22. Only one actuator arm 26 is shown in FIG. 1, but other actuator arms are aligned beneath arm 26 such that one or more arms are provided for each magnetic disk. The rotary actuator arms are thereby movable relative to storage disks.

The rotary actuator assembly 20 has a voice coil drive motor 28 secured to bearing housing 22. Voice coil drive motor 28 includes a coil 30 disposed in a flux linkage with a permanent magnet structure 32. In operation, the voice coil 30 can be energized to swing bi-directionally (depending upon the polarity of excitation) in an arc about axis 24 between the magnets of permanent magnet structure 32.

Actuator arm 26 has a distal end 34 suspended above upper disk 16. A head gimbal assembly 36 is mounted at distal end 34. The head gimbal assembly 36 includes a slider physically connected via a gimbal mount to actuator arm 26 and a read/write head installed on the slider. The read/write head is preferably a magnetic transducer that magnetically transfers information to and from storage disk 16. As voice coil 30 is energized to controllably rotate actuator arm 26 about axis 24, actuator arm 26 supports and radially positions the read/write head across storage disk 16.

Individual magnetic disks have many concentric tracks for storing data. Servo information useful in controlling and synchronizing the operation of the magnetic disks and read/write heads is also stored in the magnetic tracks. The servo information can be provided on one entire surface of a disk in the disk array (i.e., a dedicated servo disk drive) or alternatively, on each disk within the array within thin sectors interspersed between larger regions reserved for data storage (i.e., an embedded servo disk drive). The servo system is of conventional design and is not discussed in detail.

According to this invention, disk drive 10 includes fall detection means and control means mounted within housing 18. In general, the fall detection means senses when the disk drive is falling from a first elevation (for example, at a table height above a floor) to a second elevation (for example, at the floor) by monitoring acceleration of the disk drive. During a fall, the nominal acceleration if the disk drive is approximately 1 g. A warning signal is output by the fall detection means when the acceleration of the disk drive exceeds a selected acceleration threshold level indicative of a falling disk drive for a selected reference time period. In response to the warning signal, the control means instructs the storage disk and/or the actuator arm to prepare for an impending shock to be generated when the disk drive impacts a surface at the second elevation.

Upon completion of the fall and impact, the disk drive recovers to the point of operation before the falling event occurred. The disk drive remains operable because the protective action taken prior to impact minimizes, if not entirely prevents, any physical damage. Additionally, little or no data is lost due to the fall.

FIG. 8 shows the operation in more particular terms. First, net acceleration $a_{net}$ of the disk drive is continuously monitored (step 90). When the net acceleration $a_{net}$ exceeds a threshold level of, say, 0.4 g (step 92, "yes" branch), the duration of the event giving rise to the net acceleration is timed (step 94). If the measured duration exceeds a reference time period of, say, 90 msec (step 96, "yes" branch), protective action is taken to ensure that the disk is prepared for a collision (step 98). This procedure therefore imposes two tests prior to initiating protective precautions: (1) determine if net acceleration is similar to that of a free falling object, and (2) if it is, determine if the net acceleration event occurs for a sufficient amount of time to warrant a conclusion that the disk is falling, and not just being subjected to external vibrations.

Figure 2:
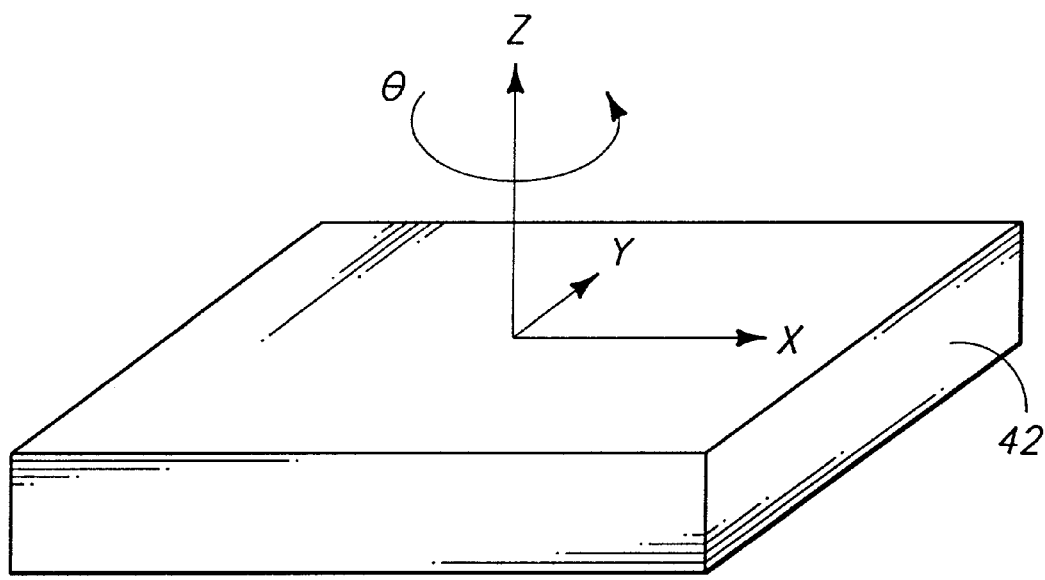
FIG. 2 is a diagrammatical illustration used to describe the operation of the accelerometer device employed in the disk drive of FIG. 1.
Figure 3:
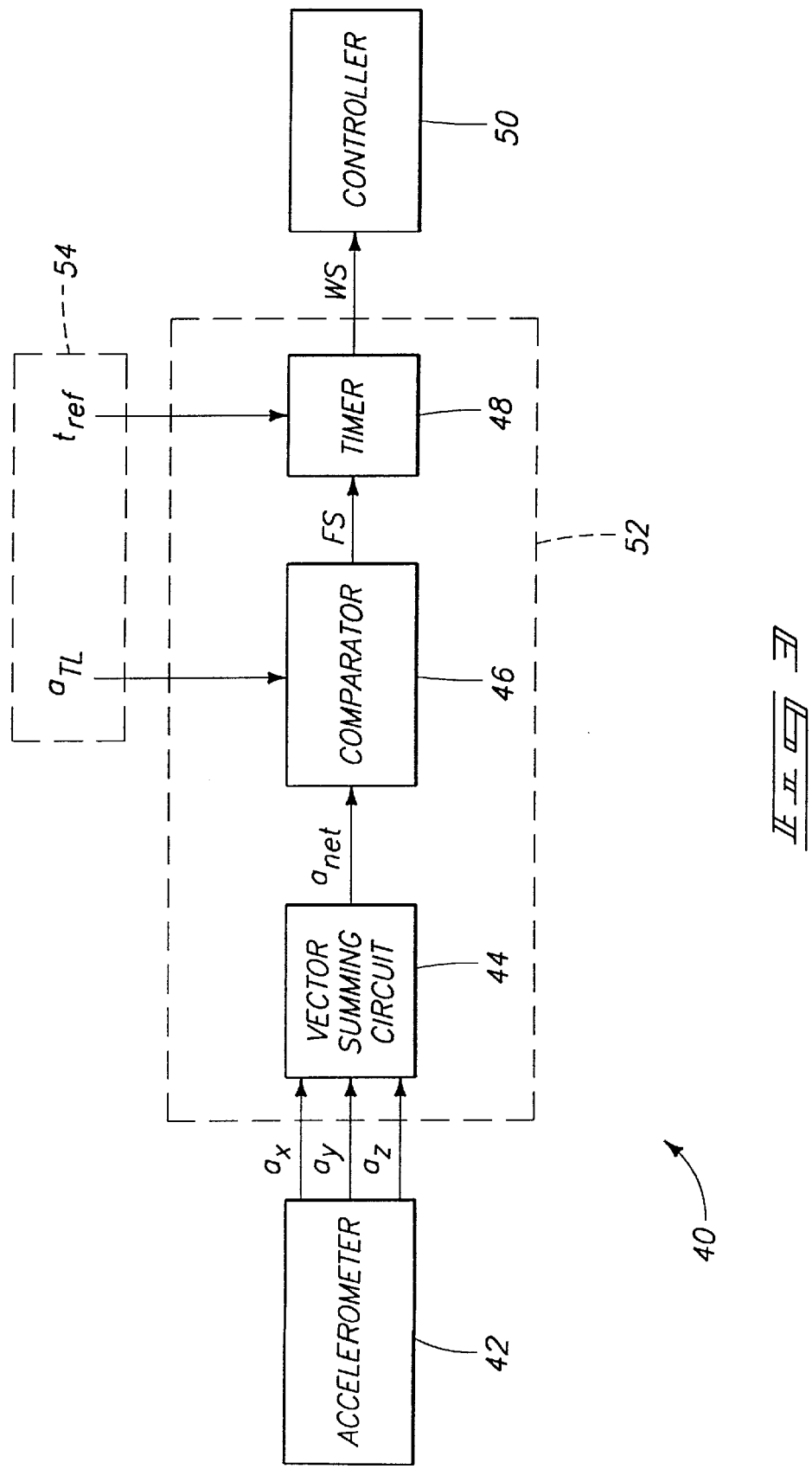
FIG. 3 is a block diagram of a fall detection and protection control system used in the FIG. 1 disk drive according to this invention.

FIG. 3 depicts the preferred embodiments of the fall detection means and control means in block form, which essentially define a fall detection and protection control system 40 for minimizing damage induced by impact shock. The control system 40 preferably has an accelerometer device 42 mounted within and secured to housing 18 of the disk drive 10 (as also shown in FIG. 1). Accelerometer device 42 has multiple sensors to measure acceleration of the disk drive at least along three mutually orthogonal axes x, y, and z. This is shown in more detail in FIG. 2. Accelerometer 42 resolves the measurement into respect vectors $a_x$, $a_y$, and $a_z$ representative of acceleration along the three axes. In addition to monitoring translational acceleration, accelerometer device 42 may also include sensors to measure one or more rotational accelerations about the axes as indicated by the rotational acceleration $\ominus$ about the z axis.

The signals associated with the three vector $a_x$, $a_y$, and $a_z$ are input to a vector summing circuit 44 (FIG. 3). Summing circuit 44 sums the vectors to produce a vector sum magnitude representative of a net acceleration $a_{net}$ of the disk drive as it falls through the air from the first elevation to the second elevation. The magnitude of the vector sum is given by the following relationship:

$$a_{net} = \sqrt{a_x^2 + a_y^2 + a_z^2}$$

The vector sum magnitude may be computed via analog or digital techniques.

It should be noted that the extraction of a signal representative of the vector sum is highly dependent upon characteristics of the accelerometer device 42 and its supporting electronics. The sum of the squares computation above is well suited for determining the vector sum. However, simpler or more practical embodiments could be employed which incorporate integrators, absolute value circuits, or circuits which output the maximum of a plurality of inputs. These other embodiments, in addition to the processor or summing circuit embodiments discussed herein, provide several different exemplary types of computational means for deriving a net acceleration of the falling disk drive.

The fall detection means also includes a comparator 46 to compare the net acceleration $a_{net}$ with the selected acceleration threshold level $a_{TL}$. Preferably, the selected acceleration threshold level $a_{TL}$ is within a range of approximately 0.4 g to 1.0 g. This range is desired because the nominal acceleration of the disk drive during a free fall is approximately 1.0 g. In addition to a comparator, other evaluation means for comparing the net acceleration with the threshold level may be used, such as special logic circuitry or a look-up table.

If the net acceleration $a_{net}$ of the disk drive exceeds the threshold level $a_{TL}$, indicating that the disk drive might be in a free fall, the comparator outputs a first signal FS. On the other hand, if the net acceleration $a_{net}$ fails to exceed the threshold level $a_{TL}$, the comparator will not output the first signal FS.

A timer 48 is coupled to receive the first signal FS from the comparator 46 and time its duration. When the measured duration exceeds a reference time period $t_{ref}$, timer 48 outputs a warning signal WS to controller 50. Although not shown, another comparator can be used to compare the duration of the first signal FS measured by the timer with the reference time period $t_{ref}$. The reference time period is preferably a duration of sufficient length to conclude that the disk drive is actually in a dangerous free fall, as opposed to experiencing some minor vibration or jolting that causes an increase in the magnitude of net acceleration for a short period of time. As will be described in more detail below, a preferred reference time period is at least 90 msec.

Timer 48 may be embodied as a device for determining absolute temporal duration, or as a counter, or as any other form of timing means for measuring durations of a signal. In addition, the timer 48 may be sensitive to the net acceleration signal itself. The timer can be configured to measure the duration of net acceleration signal as it remains above the threshold level, or to detect the zero crossings of the net acceleration whereby many zero crossings in a short duration would indicate that the disk drive is undergoing vibration and is not in a free fall.

According to the above procedure, the warning signal WS is produced only after two conditions are met. First, the disk drive must be simulating free fall acceleration conditions (i.e., the magnitude of the net acceleration of the disk drive exceeds the threshold of approximately 0.4 to 1.0 g). Second, the free fall condition has existed for a specified time period beyond normal vibrations, random noise, or the like. The warning signal WS therefore indicates that the disk drive is truly in a free fall state and thus, the disk drive 10 must be prepared for a collision with the floor or some other surface.

The controller 50 prepares the disk drive for imminent collision in a manner effective to minimize damage resulting from the impending shock. One technique is to initiate a seek to the inner radius landing zone of the storage disk so that the read/write head is moved away from the tracks. This location minimizes potential damage to the slider, head, suspension, and disk, while simultaneously preventing write errors. A second technique is to hold the actuator against the disk assembly crash stop with maximum actuation torque, thereby maximizing the resistance of the head to swing over data. A third technique is to brake the spindle assembly and thereby stop the array of storage disks 12 from spinning around axis 14. A fourth technique for use with disk drives capable of dynamically loading and unloading the slider is to simply unload or remove the slider from the disk.

In FIG. 3, the component blocks are illustrated to facilitate an understanding of the novel fall detection and protection control system that detects free fall conditions and then prepares the disk drive for shock. Other embodiments are possible. For instance, the functions associated with vector summing, comparing, and timing can be programmed into a processor, as indicated by the dashed box 52. Processor 52 can be a microprocessor, a digital signal processor, a special ASIC, or some other type of integrated unit. Similarly, the acceleration threshold level $a_{TL}$ and the reference time period $t_{ref}$ can be stored in memory resident within the processor, or in a separate memory 54 (such as a ROM).

In one possible scheme involving the processor embodiment, the simple acceleration vector signals $a_x$, $a_y$, and $a_z$ could be sampled and numerically processed by a digital signal processor (DSP) or microprocessor to derive the vector sum for threshold comparison at a relatively slow sample speed (e.g., the servo position sampling period on the order of several hundred microseconds). A signal representative of the vector sum acceleration or velocity is monitored for zero crossing between samples to distinguish between a falling event and vibration. If the device is also equipped with rotational sensors, output from them could be used to extract net translational acceleration from the translational sensors.

As previously discussed, the preferred acceleration threshold level $a_{TL}$ is approximately 0.4 g to 1.0 g. The net acceleration experienced by a free falling disk drive is 1 g, but degradation of the accelerometer signal due to low frequency characteristics may result in an output of less than 1 g; thus, threshold levels of less than 1 g are appropriate. The preferred reference time period $t_{ref}$ is approximately 90 msec or more. To facilitate a better appreciation and understanding of this invention, the following discussion explains the factors involved in selecting the preferred reference time period.

There are four primary issues to be considered in selecting the reference time period $t_{ref}$. First, the fall detection device should not be set to initiate protective action during normal vibration conditions, even though the vibrations cause the drive to exceed the acceleration threshold level. For example, an external vibration applied to the disk drive may cause an acceleration above the 1 g threshold level, but only for a very short period of time. The instantaneous magnitude spike is not indicative of a free falling device, and thus the fall detection and protection control system should discard this event. The reference time period $t_{ref}$ should therefore be set to a sufficient duration that would exclude most normal vibrations (typical environmental specifications include operating vibrations down to 5 Hz). On the other hand, a second consideration is that the reference time period cannot be too long that the fall detection device fails to timely take precautionary measures prior to impact.

Third, the sensors of accelerometer device 42 are not ideal. The device might not be precisely calibrated, or it might exhibit a wide sensitivity tolerance for the different sensors, or its low frequency operation might be subject to some high pass roll off characteristics. There might also be crosstalk between the sensors. A fourth and somewhat related consideration is that the ability to process signals may be limited by the capabilities of low voltage analog circuitry or by the geometry of the acceleration sensors. Accordingly, the reference time period $t_{ref}$ should accommodate for imprecision and frequency response characteristics of the accelerometer device 42.

The reference time period is therefore useful in differentiating a free fall from a vibration and in compensating for non-ideal accelerometers. It is desirable to select a reference time period $t_{ref}$ which is both short enough to initiate protective action against a fall capable of producing shocks of damaging magnitudes, and long enough to reject false triggers during external vibration conditions which are within operating specifications.

Figure 4:
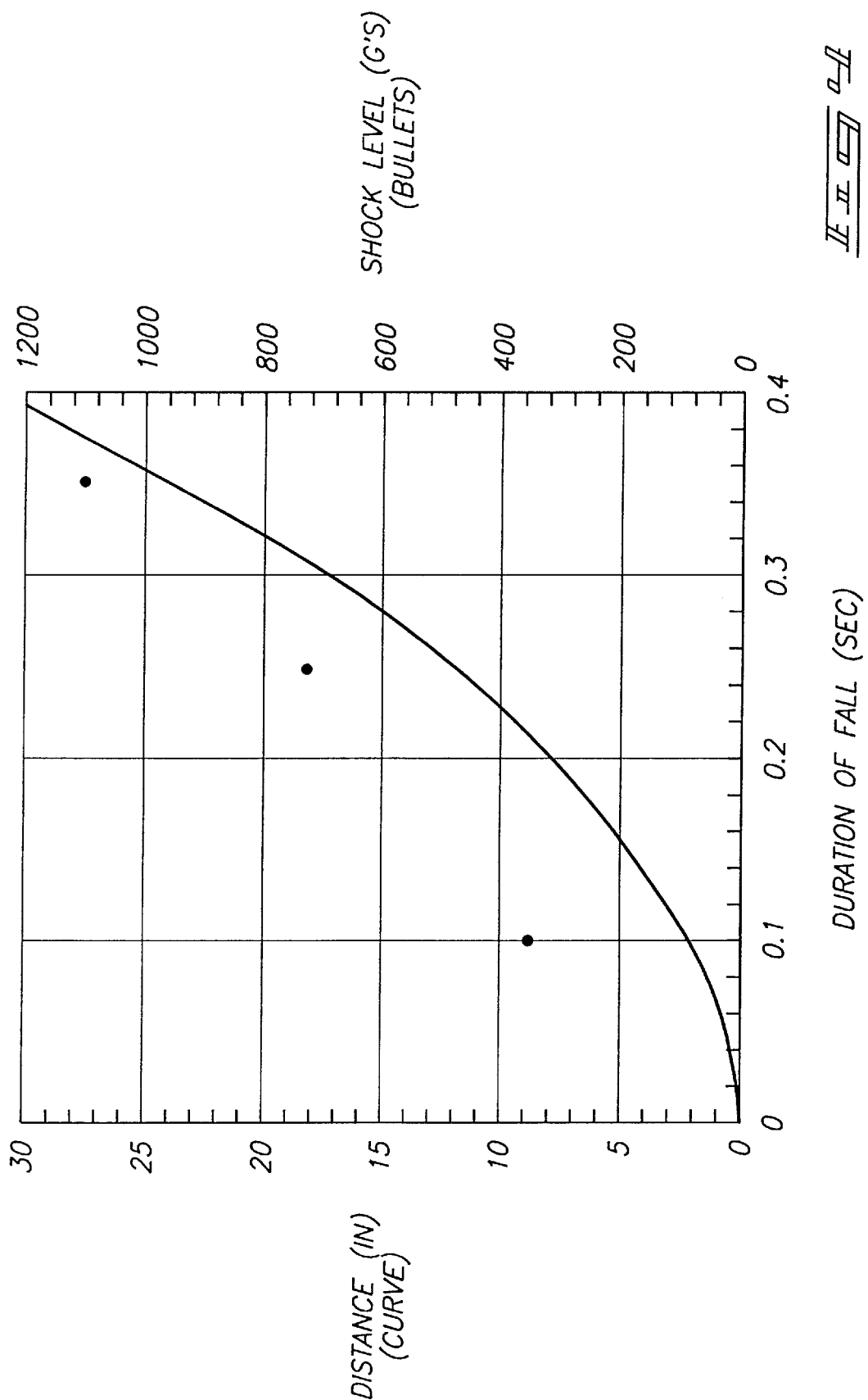
FIG. 4 is a graph illustrating the relationship among fall distance, duration of fall, and resulting shock level at impact.

FIG. 4 shows the height of fall (left vertical axis) as a function of the fall duration, represented by the solid line. The graph also shows the shock impact magnitude (right vertical axis) experienced by a palmtop computer dropped onto a hard surface, represented by the circular bullets, recorded at times of 0.1 sec (100 msec), 0.25 sec (250 msec), and 0.35 sec (350 msec). It is first noted that the impact shock magnitude increases with the height of the fall. Secondly, notice that a fall of only nine inches results in a significant shock impact of nearly 400 g's.

Figure 5:
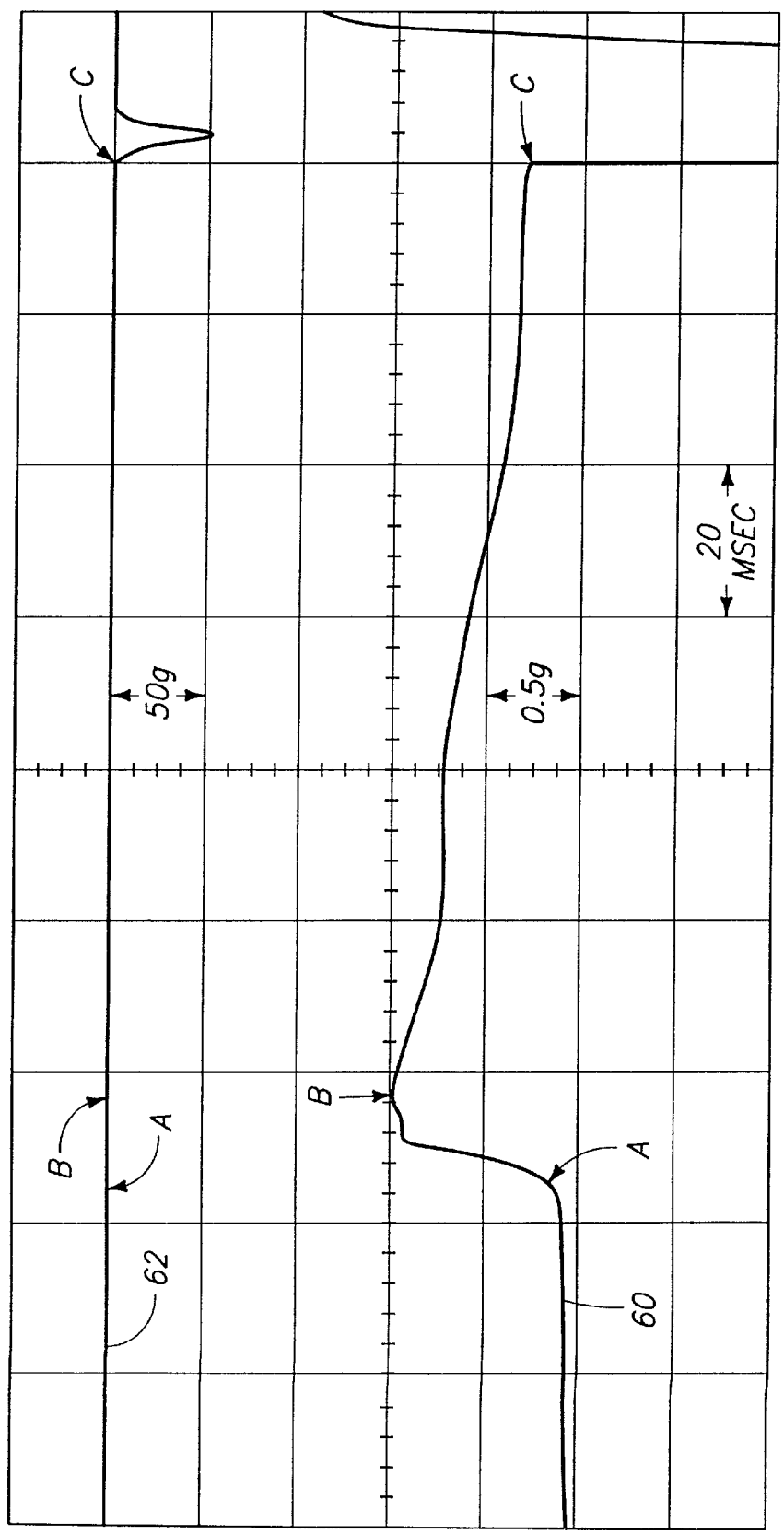
FIG. 5 is a diagrammatic oscilloscope output showing the effects of an object representative of a disk drive during a free falling event followed by an impact.
Figure 6:
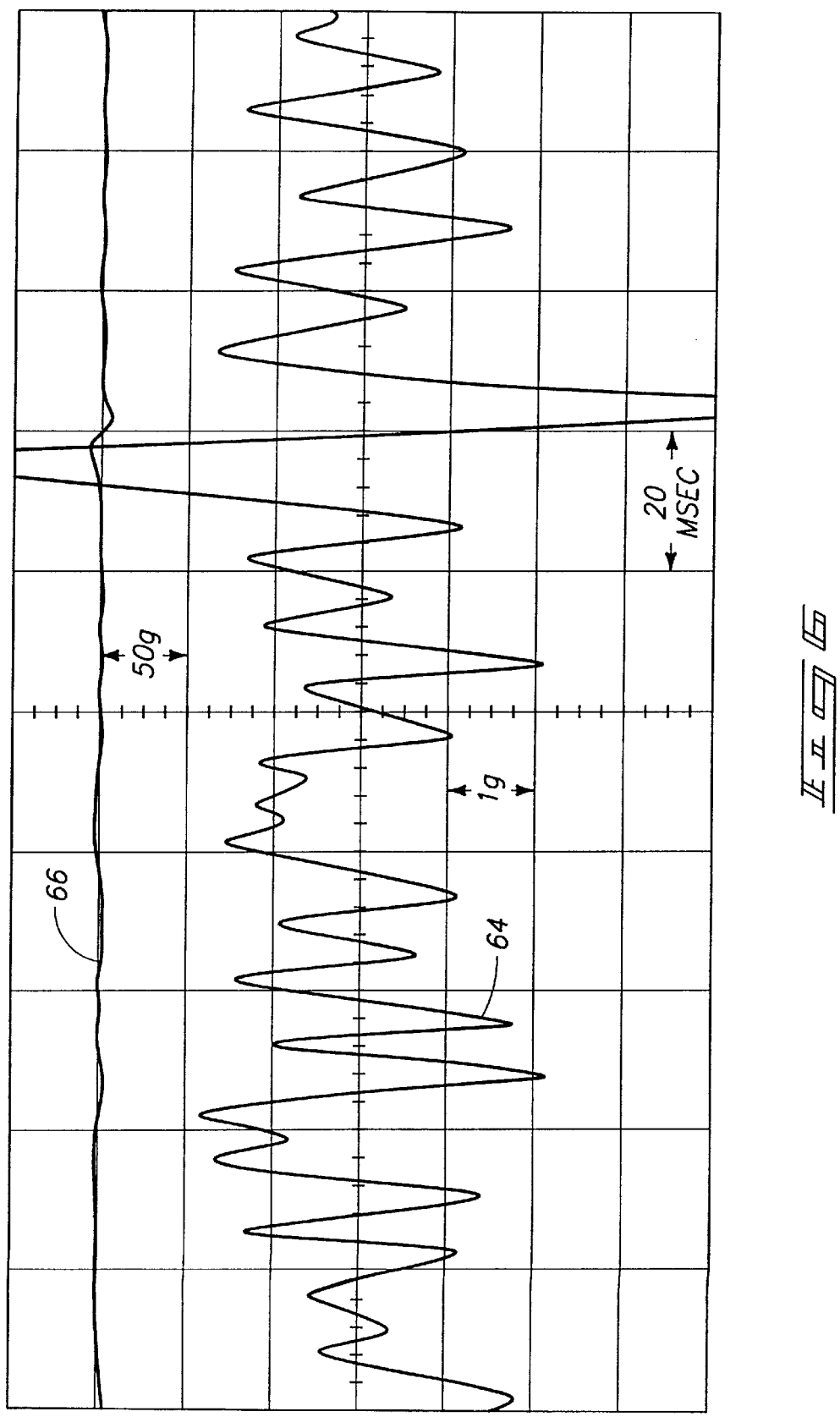
FIG. 6 is a diagrammatic oscilloscope output showing the effects on an object representative of a disk drive during random vibration.

FIGS. 5 and 6 illustrate two contrasting events of a disk drive. FIG. 5 depicts an example fall event wherein the disk drive is dropped from one elevation to another, whereas FIG. 6 depicts the effects of random vibration on the disk drive. More specifically, FIG. 5 shows the net acceleration output of a small object equipped with an accelerometer (i.e., representative of a small disk drive) that results from a free fall of approximately three inches. Time is given along the horizontal scale, with each grid segment representing 20 msec. The lower waveform 60 is the fall event at high sensitivity with each vertical grid segment representing 0.5 g. As shown by lower waveform 60, the fall begins at point A and the disk drive quickly achieves a net acceleration component of 1.0 g at point B. The magnitude of the acceleration begins to decay over time from the 1.0 g level due to the low frequency roll off inherent in the accelerometer device. At point C, the disk drive impacts the surface, causing a significant shock as represented by the instantaneous downward magnitude spike. The impact (at point C) occurs approximately 130 msec after the fall began (at point A).

Upper waveform 62 illustrates the same event at a reduced, low sensitive scale to demonstrate the relative magnitude of the shock. According to this scale, each vertical grid segment represents 50 g, with the shock magnitude peaking at approximately 50 g.

In contrast to the above "free falling" event, FIG. 6 illustrates a sample of random vibration applied to the object. The lower waveform 64 is at high sensitivity on a scale wherein each vertical grid segment represents 1.0 g. The upper waveform 66 is set to a scale wherein each vertical grid segment is 50 g. Contrasting this event to the free falling event of FIG. 5, the random vibration consists of many zero crossings which distinguish it from a free falling event. Although the random vibration has many spikes with magnitudes that exceed the acceleration threshold level of, say, 1 g, the comparatively short duration of these magnitudes are all less than 20 msec.

Figure 7:
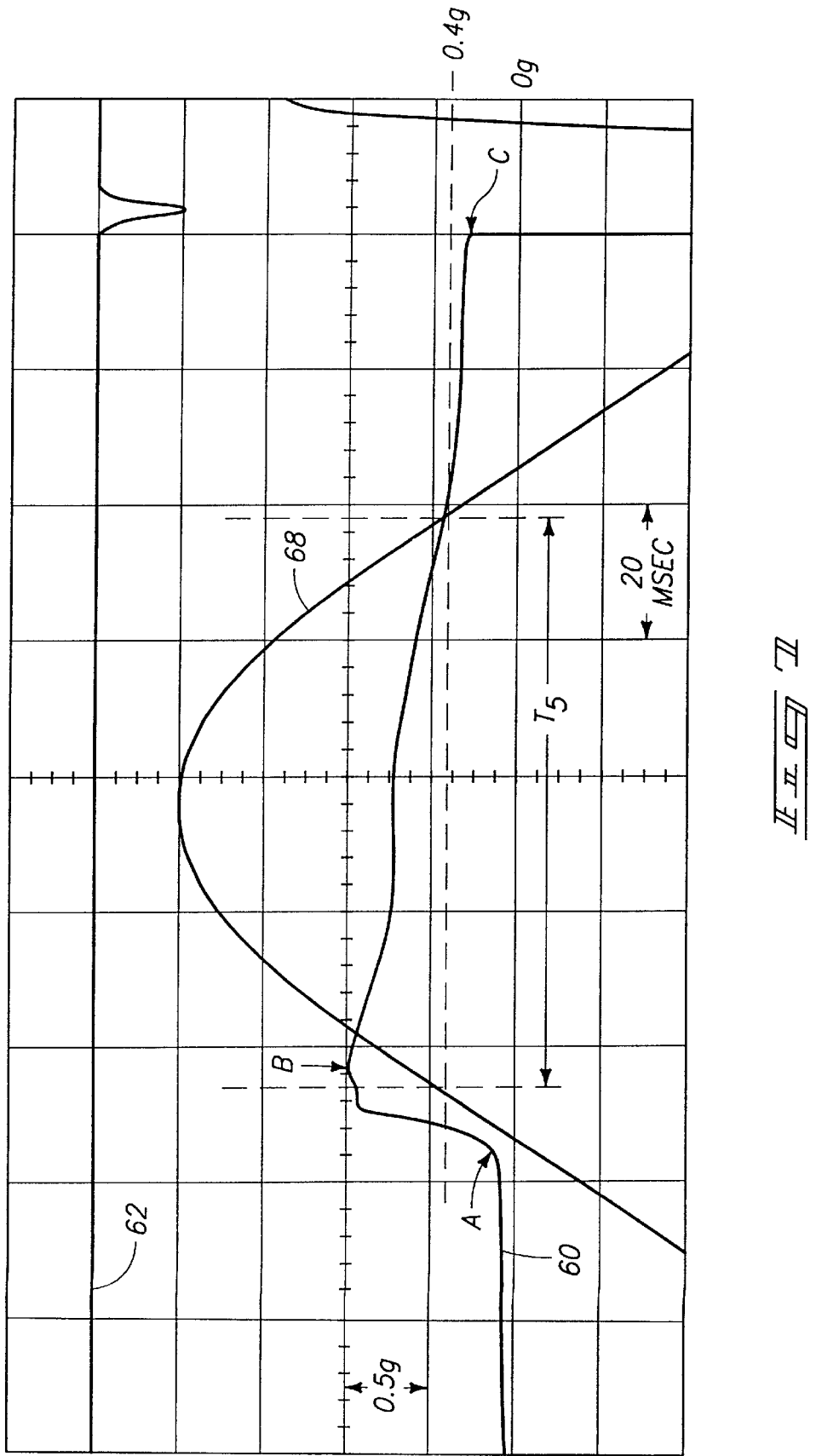
FIG. 7 is the diagrammatic oscilloscope output of FIG. 5, but further including an overlaid 50 Hz sinusoidal waveform.

FIG. 7 illustrates the fall event waveform 60, identical to that shown in FIG. 5, but with a 5 Hz frequency, 2 g peak magnitude sine wave 68 overlaid on the waveform. Five hertz represents the lowest frequency vibration typically required by operating specifications. The half period for a 5 Hz sine wave 68 is 100 msec. Because this represents the lowest acceptable vibration frequency, the fall detection means should be calibrated to preclude triggering during a 5 Hz vibration. The acceleration threshold level $a_{TL}$ is set at 0.4 g. The 2 g amplitude, 5 Hz sine wave exceeds this acceleration threshold level $a_{TL}$ for a duration of $T_5$ which is approximately 87 msec. The waveform 60 of the fall event, however, exceeds the threshold level for approximately 91 msec. Accordingly, a reference time period $t_{ref}$ of approximately 90 msec effectively discriminates between the low 5 Hz vibration and a fall event.

The fall detect function of this invention complements the write protect functions presently in prior art disk drives. According to one example write protect function, writing is interrupted when acceleration in any one direction exceeds a prescribed level of typically 2.5–10 g's (for translational sensors). For severe vibrations and the like, the write protect function will prevent data loss or misregistration. On the other hand, in the event that the disk drive is dropped, the acceleration only reaches 1 g, which is not sufficient to enable the write protect function. The 1 g acceleration is, however, sufficient to enable the fall detect function.

As an example of how the fall detect control system of this invention cooperates with the prior art write protect function, assume a 1 g fall is detected for a duration of 100 msec (thereby satisfying both conditions of the fall detection and protection system). The total distance traveled by a falling object is determined by the equation:

$$d = \tfrac{1}{2}at^2$$

where d is distance, a is the net acceleration of gravity or 9.8 m/sec², and t is time.

After 100 msec, the disk drive has fallen approximately 0.049 meters, or about 2 inches. At this point, the control system initiates a protective action, such as a seek command to the landing zone. A full stroke seek command takes approximately 25 msec, bringing the total fall duration to 125 msec. After 125 msec, the distance traveled by the disk drive is approximately 0.077 meters, or about 3 inches.

Accordingly, for any fall greater than 3 inches, the fall detection and protection control system of this invention will have retracted the read/write head to the landing zone prior to impact, thereby minimizing or avoiding any shock-induced damage. For falls less than 3 inches, the impact will trigger the write protect function to disable any writing process, as such small distances will most likely not cause damage to the disk drive.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A disk drive comprising:

a housing;

at least one storage disk rotatably connected to the housing to spin about an axis of rotation and having an inner and outer circumference defining a zone for recording data;

at least one actuator arm operably connected to the housing to move relative to the storage disk and radially position a read/write head across the storage disk;

fall detection means mounted within the housing for sensing when the disk drive is falling from a first elevation to a second elevation by monitoring acceleration of the disk drive, the fall detection means outputting a warning signal when the acceleration of the disk drive exceeds a selected acceleration threshold level indicative of a falling disk drive for a selected reference time period of at least 90 msec; and control means for preparing, in response to the warning signal output by the fall detection means, at least one of the storage disk and the actuator arm for a shock induced when the disk drive impacts a surface at the second elevation, and wherein for preparing the actuator arm, the control means is configured to instruct the actuator arm to move toward the inner circumference of the disk in preparation for impact with the surface.

* * * * *